(12) United States Patent
Bhorkar et al.

(10) Patent No.: US 10,827,525 B2
(45) Date of Patent: Nov. 3, 2020

(54) SYSTEMS, METHODS AND DEVICES FOR SHARING A WIRELESS MEDIUM USING LISTEN BEFORE TALK

(71) Applicant: APPLE INC., Cupertino, CA (US)

(72) Inventors: Abhijeet Bhorkar, Fremont, CA (US); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/742,388

(22) PCT Filed: Dec. 21, 2015

(86) PCT No.: PCT/US2015/067108
§ 371 (c)(1),
(2) Date: Jan. 5, 2018

(87) PCT Pub. No.: WO2017/052677
PCT Pub. Date: Mar. 30, 2017

(65) Prior Publication Data
US 2018/0206269 A1 Jul. 19, 2018

Related U.S. Application Data

(60) Provisional application No. 62/232,378, filed on Sep. 24, 2015.

(51) Int. Cl.
*H04W 74/08* (2009.01)
*H04W 72/14* (2009.01)
(Continued)

(52) U.S. Cl.
CPC ....... *H04W 74/0816* (2013.01); *H04L 5/0094* (2013.01); *H04W 16/14* (2013.01);
(Continued)

(58) Field of Classification Search
CPC ......... H04L 5/00; H04L 5/001; H04L 5/0094; H04W 16/14; H04W 72/1268; H04W 72/14; H04W 74/0808; H04W 74/0816
See application file for complete search history.

(56) References Cited

U.S. PATENT DOCUMENTS 7,221,681 B2 * 5/2007 Choi ................. H04W 74/0841
370/447
8,576,809 B2 * 11/2013 Wentink ............. H04W 74/006
370/336
(Continued)

OTHER PUBLICATIONS

Catt, "UL LBT framework for LAA", R1-153922, 3GPP TSG RAN WG1 Meeting #82, Beijing, China, Agenda Item 7.2.4.1, Aug. 24-28, 2015, 3 pages.
(Continued)

*Primary Examiner* — Asad M Nawaz
*Assistant Examiner* — Thomas R Cairns
(74) *Attorney, Agent, or Firm* — Stoel Rives LLP

(57) ABSTRACT

Licensed assisted access (LAA) uplink (UL) transmissions can be performed using UL scheduling, enhanced node B (eNB) listen before talk (LBT), and user equipment (UE) LBT. A scheduling of a UE for UL transmission can include different procedures for a UE to perform LBT before UL transmission. These procedures can be classified as: i) a scheduled UE performing no LBT for UL transmission, ii) a scheduled UE performing fast LBT (as compared to the eNB) with a more aggressive choice of parameters than the eNB and iii) a scheduled UE performing LBT using parameters as used by the eNB for LBT. In some embodiments, the UL grant transmission by the eNB occurs in the unlicensed band after a successful LBT procedure at the eNB.

8 Claims, 13 Drawing Sheets

(51) Int. Cl.
  *H04L 5/00*    (2006.01)
  *H04W 16/14*   (2009.01)
  *H04W 72/12*   (2009.01)

(52) U.S. Cl.
  CPC ....... *H04W 72/1268* (2013.01); *H04W 72/14* (2013.01); *H04L 5/001* (2013.01); *H04W 74/0808* (2013.01)

(56) References Cited

U.S. PATENT DOCUMENTS

| | | | | |
|---|---|---|---|---|
| 8,750,262 B2* | 6/2014 | Laroia | ................... | H04L 5/0035 |
| | | | | 370/338 |
| 9,215,732 B2* | 12/2015 | Abraham | .......... | H04W 74/0808 |
| 9,585,171 B2* | 2/2017 | Kwon | ............... | H04W 74/0816 |
| 9,860,713 B2* | 1/2018 | Seok | ........................ | H04W 4/06 |
| 10,057,785 B2* | 8/2018 | Kwak | ..................... | H04L 27/26 |
| 10,390,304 B2* | 8/2019 | Sundman | | |

| | | | | |
|---|---|---|---|---|
| 2016/0088642 A1* | 3/2016 | Yang | ..................... | H04W 24/08 |
| | | | | 455/451 |
| 2016/0212767 A1* | 7/2016 | Yin | ........................ | H04W 24/08 |
| 2018/0235010 A1* | 8/2018 | Harada | .................. | H04W 16/14 |

OTHER PUBLICATIONS

Intel Corporation, "Uplink transmission with LBT", R2-151102, 3GPP TSG-RAN WG2 #89bis, Bratislava, Slovakia, Agenda Item 7.1.3, Apr. 20-24, 2015, 6 pages.

LG Electronics, "UL LBT design in LAA", R1-154263, 3GPP TSG RAN WG1, Meeting #82, Beijing, China, Agenda Item 7.2.4.1, Aug. 24-28, 2015, 6 pages.

PCT/US2015/067108, International Search Report and Written Opinion, dated Jun. 16, 2016, 14 pages.

ZTE, "UL framework for LAA", R1-154048, 3GPP TSG RAN WG1, Meeting #82, Beijing, China, Agenda Item 7.2.4.1, Aug. 24-28, 2015, 6 pages.

* cited by examiner

SYSTEMS, METHODS AND DEVICES FOR SHARING A WIRELESS MEDIUM USING LISTEN BEFORE TALK

This application is a national stage filing under 35 U.S.C. § 371 of International Patent Application No. PCT/US2015/067108, filed Dec. 21, 2015, which claims the benefit under 35 U.S.C § 119(e) of U.S. Provisional Application No. 62/232,378 filed Sep. 24, 2015, each of which is incorporated by reference herein its entirety.

TECHNICAL FIELD

The present disclosure relates to wireless communications and more specifically to using listen before talk to share a wireless medium.

DETAILED DESCRIPTION

Figure 1:
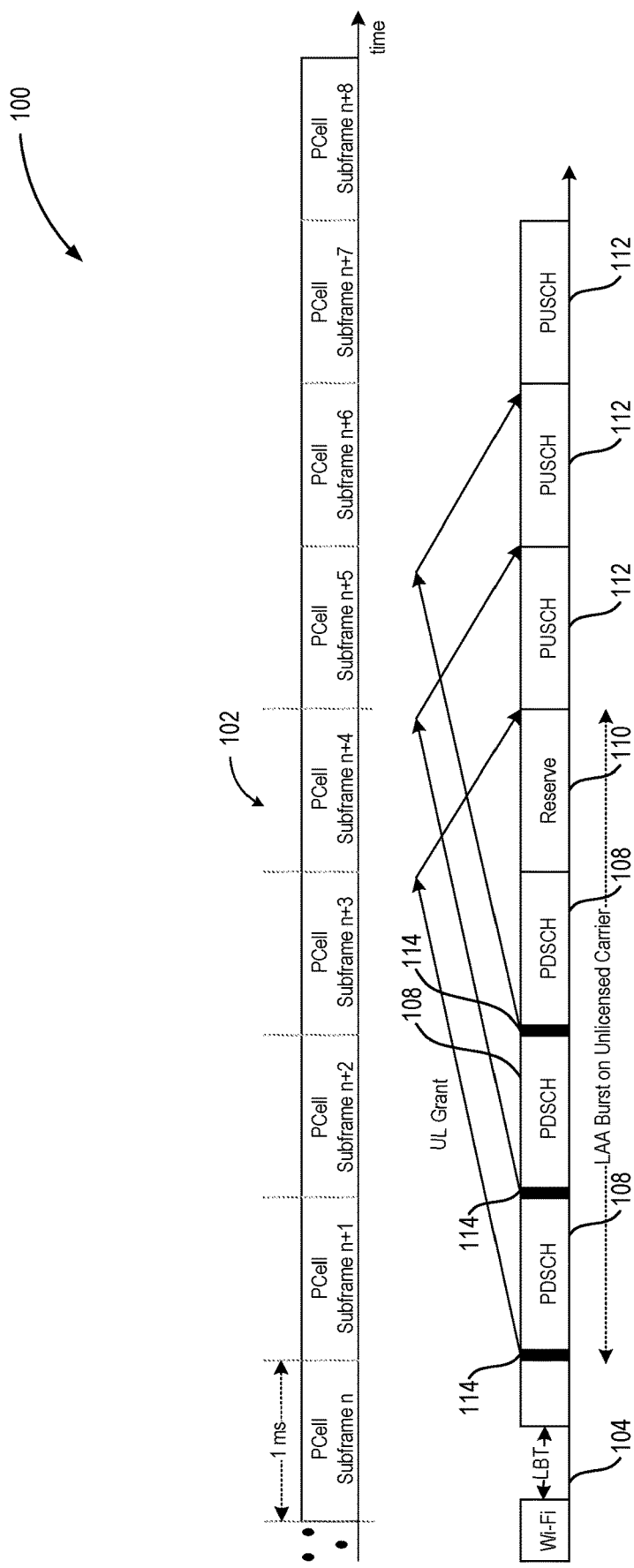
FIG. 1 is a diagram illustrating self-carrier scheduling with a reservation signal and no uplink (UL) listen before talk (LBT) consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Techniques, apparatus and methods are disclosed that enable licensed assisted access (LAA) uplink (UL) transmission using UL scheduling, enhanced node B (eNB) listen before talk (LBT), and user equipment (UE) LBT. A scheduling of a UE for UL transmission can include different procedures for a UE to perform LBT before UL transmission. These procedures can be classified as: i) a scheduled UE performing no LBT for UL transmission, ii) a scheduled UE performing fast LBT (as compared to the eNB) with a more aggressive choice of parameters than the eNB and iii) a scheduled UE performing LBT using parameters as used by the eNB for LBT. In some embodiments, the UL grant transmission by the eNB occurs in the unlicensed band after a successful LBT procedure at the eNB.

In some embodiments, a LBT method can include different categories. For example, a category 1 LBT does not use LBT. A category 2 LBT can use LBT without a random back-off A category 3 LBT can use LBT with a random back-off with a fixed size of contention window. A category 4 LBT can use LBT with a random back-off with a variable size of contention window.

An eNB can use LBT or not for transmission of a UL grant on a licensed or unlicensed carrier. For example, an eNB can perform a category 4 LBT before transmission of UL grant on the unlicensed carrier for self-carrier scheduling. An eNB may perform category 4 LBT before transmission of UL grant on the licensed carrier for cross-carrier scheduling. An eNB may not perform any LBT before transmission of UL grant on the licensed carrier. In some embodiments, upon transmission of the UL grant in subframe n, the scheduled LAA UEs also perform LBT before carrying out their UL transmission in the subframe n+4.

The scarcity of licensed spectrum for cellular communications below 6 GHz has motivated the consideration of unlicensed bands for the operation of LTE. In particular, the less crowded 5 GHz bands currently used mostly for Wi-Fi have been proposed for LTE deployment, offering a vast potential for increasing LTE throughput. Overall, the design principles for LAA may include integration with the licensed spectrum, minimum change of the LTE air-interface, and guaranteed co-existence with other systems using unlicensed spectrum, such as Wi-Fi.

One of the most important design goals of LAA is fair coexistence with other radio access technologies (RATs) such as Wi-Fi and/or other LAA networks deployed by other operators. To meet the design goal, LBT has been considered as an enabling technology, where data packets are transmitted only when the channel is sensed to be idle.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

FIG. 1 is a diagram illustrating self-carrier scheduling 100 with a reservation signal 110 and no uplink (UL) listen before talk (LBT). In some embodiments, no LBT is performed before physical uplink shared channel (PUSCH) transmissions 112 on a shared wireless medium (or channel) with self-carrier scheduling 100. For example, a downlink (DL) transmission (e.g., physical downlink shared channel (PDSCH) 108), which can include UL grants 114, can be followed with a reservation signal 110 up until scheduled UL transmissions (e.g., PUSCH transmissions 112). This reservation signal 110 allows the UE to avoid LBT for the PUSCH transmissions 112.

In the embodiment shown, the eNB performs LBT 104, while the scheduled UE does not perform any sensing. The eNB after performing LBT 104 ensures that it transmits physical downlink control channel (PDCCH) (or enhanced PDCCH (ePDCCH)) and/or a reservation signal 110, so that the channel is occupied until the expected start of the PUSCH transmissions 112. In cases where there is no DL traffic, in some embodiments, PDSCH 108 may not be transmitted. By transmitting a reservation signal 110 (which may be a data signal such as DRS or a noise signal), the eNB ensures that another transmitter does not occupy the channel until the PUSCH transmissions 112 begin.

FIG. 1 shows an illustration describing an embodiment of a possible sequence of PDSCH transmissions 108 and PUSCH transmissions 112. In this embodiment, one of the DL subframes uses reservation signal 110, as a PDSCH transmission and/or PDCCH transmission is not present. The transmissions (e.g., frames, symbols, etc.) can be synchronized with a licensed channel (as shown in FIGS. 1-8 references 102, 202, 302, 402, 502, 602, 702 and 802) or unsynchronized (not shown).

Figure 2:
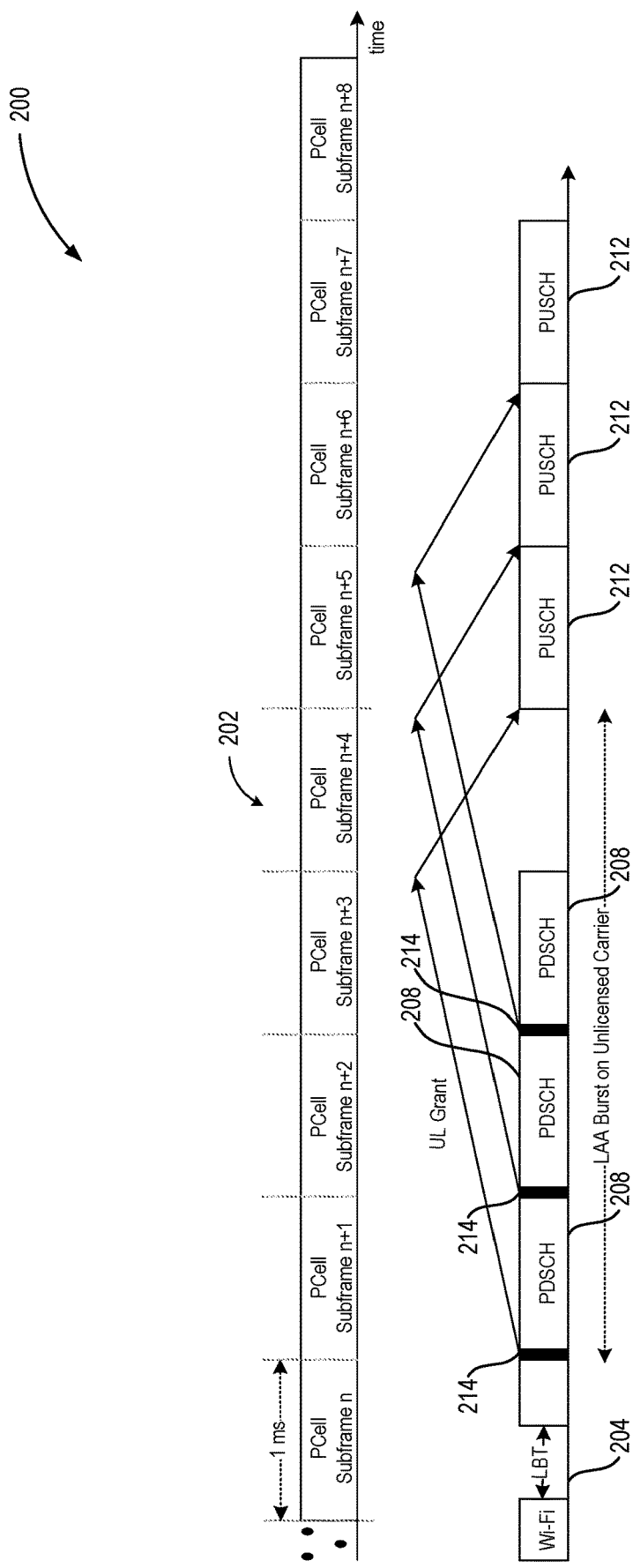
FIG. 2 is a diagram illustrating self-carrier scheduling with no reservation signal and no UL LBT consistent with embodiments disclosed herein.

FIG. 2 illustrates self-carrier scheduling 200 with no reservation signal and no uplink (UL) listen before talk (LBT). In some embodiments, DL transmissions (e.g., PDSCH 208), which can include UL grants 214, is followed without a reservation signal and no LBT is used by a UE before UL transmissions (e.g., PUSCH transmissions 212).

In this option, the eNB performs LBT 204, while the UE does not perform any sensing. Different than shown in FIG. 1, a reservation signal is not transmitted. However, if DL traffic is present, PDSCH transmissions 208 can be transmitted to occupy the channel. FIG. 2 shows an illustration describing a possible sequence of PDSCH transmissions 208 and PUSCH transmissions 212 when the reservation signal is not used.

Figure 3:
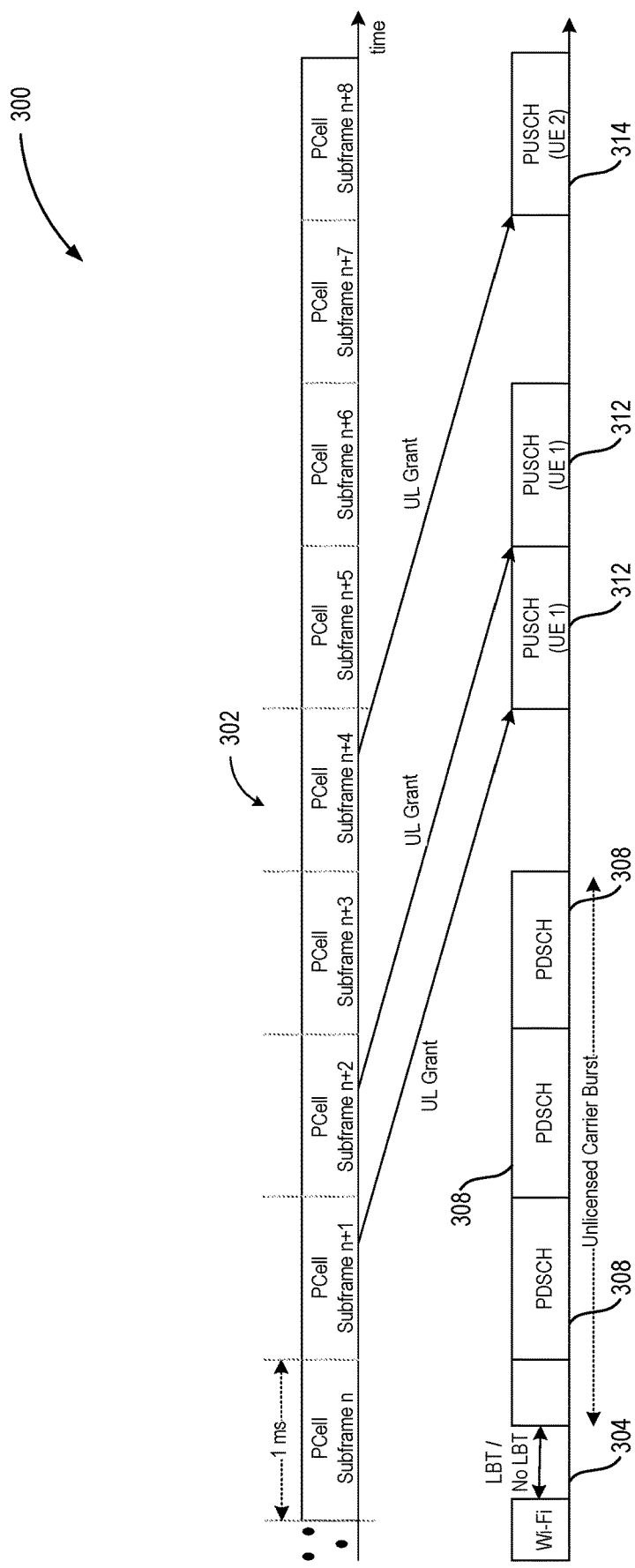
FIG. 3 is a diagram illustrating cross-carrier scheduling with no reservation signal and no UL LBT consistent with embodiments disclosed herein.

FIG. 3 illustrates cross-carrier scheduling 300 with no reservation signal and no uplink (UL) listen before talk (LBT). In some embodiments, no LBT is used before PUSCH transmissions 312 and 314 with cross-carrier scheduling 300. UL grants are given in a carrier within a licensed wireless medium 302, and PUSCH transmissions are given in a carrier in the shared wireless medium (e.g., an unlicensed wireless medium). PDSCH transmissions 308 can also be given in the shared wireless medium.

In this embodiment, an eNB can perform LBT 304 or may not perform LBT 304. The UEs do not perform LBT for PUSCH transmissions, such as PUSCH transmissions 312 by UE 1 and PUSCH transmission 314 by UE 2.

Figure 4:
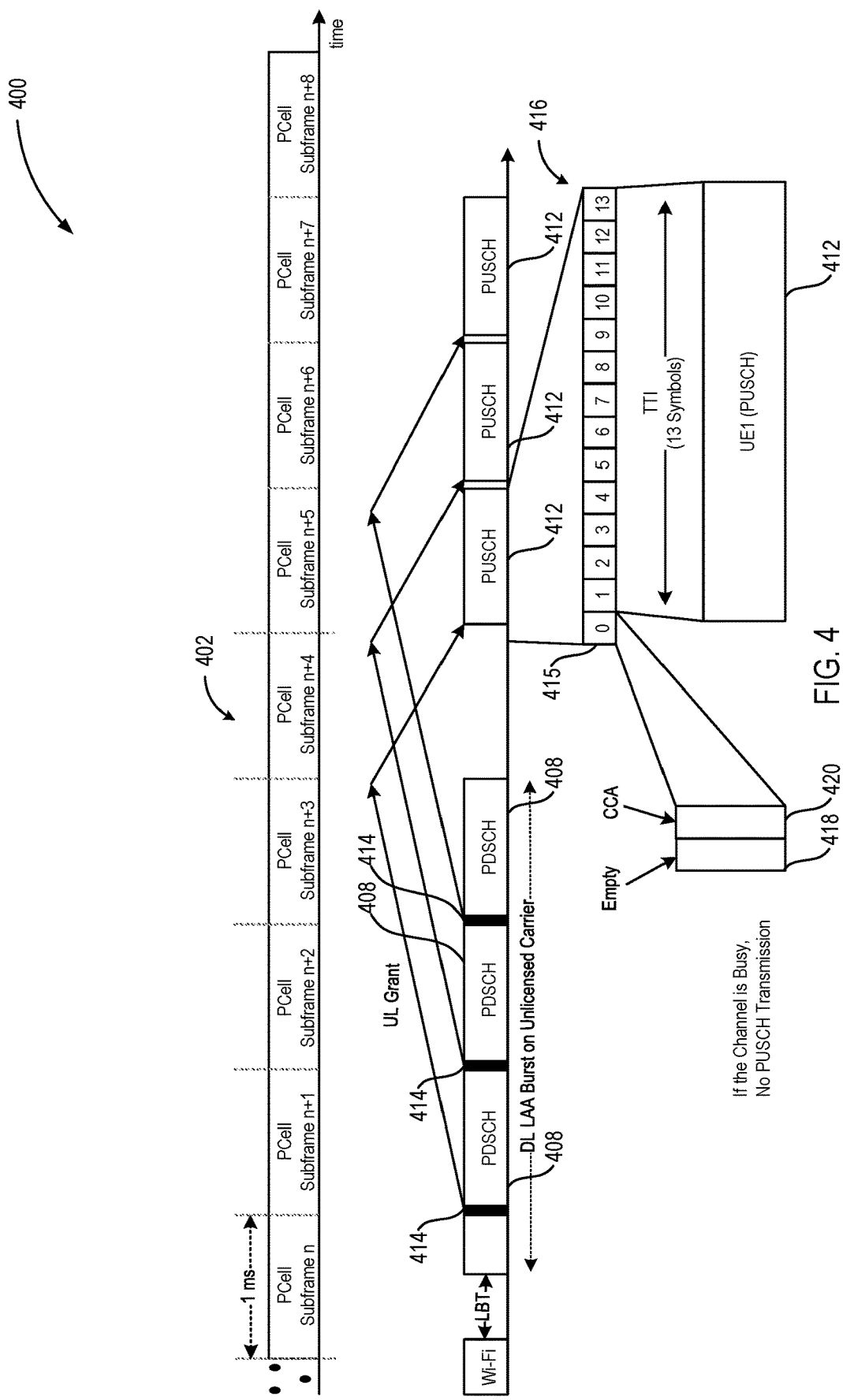
FIG. 4 is a diagram illustrating self-carrier scheduling with UL LBT sensing using a first symbol of a UL subframe consistent with embodiments disclosed herein.

FIG. 4 illustrates self-carrier scheduling 400 with UL LBT sensing using a first symbol 415 of a UL subframe 416. In the embodiment shown, a single interval LBT (e.g., a one shot clear channel assessment (CCA) 420) can be performed before PUSCH transmissions 412 with self-carrier scheduling. In some embodiments, a DL transmission (e.g., PDSCH 408, which can include UL grant 414) follows an eNB performing LBT and a reservation signal. A fast LBT, such as the single interval LBT, can be used by a UE before PUSCH transmissions 412.

In the embodiment shown, a scheduled UE performs sensing for a single interval (e.g., 25 µs or 34 µs) before each PUSCH transmission 412. After receiving a UL grant 414, a UE performs LBT during a first symbol 415 of the subframe 416 scheduled for UL transmission. The CCA 420 can be performed at the end of the symbol, just before a PUSCH transmission 412. The remaining portion of the symbol 418 can be left empty with no transmission.

Other symbols and/or subframes can be used for LBT. In another embodiment, a UE performs LBT during the symbol of the previous subframe (e.g., symbol 13 of subframe 416). In other embodiments, the eNB may puncture the symbols of a DL subframe (e.g., PDSCH transmissions 408) to allow a UE to perform LBT.

If the LBT cannot be completed during the allowed duration of one symbol, a scheduled PUSCH 412 is not transmitted. In some embodiments, the UE may perform single interval sensing at the end of the first symbol 415 and use a reservation signal until the subframe boundary. In other embodiments, the UE may perform single interval sensing at the start of the first symbol 415 and use a reservation signal until the symbol boundary.

Figure 5:
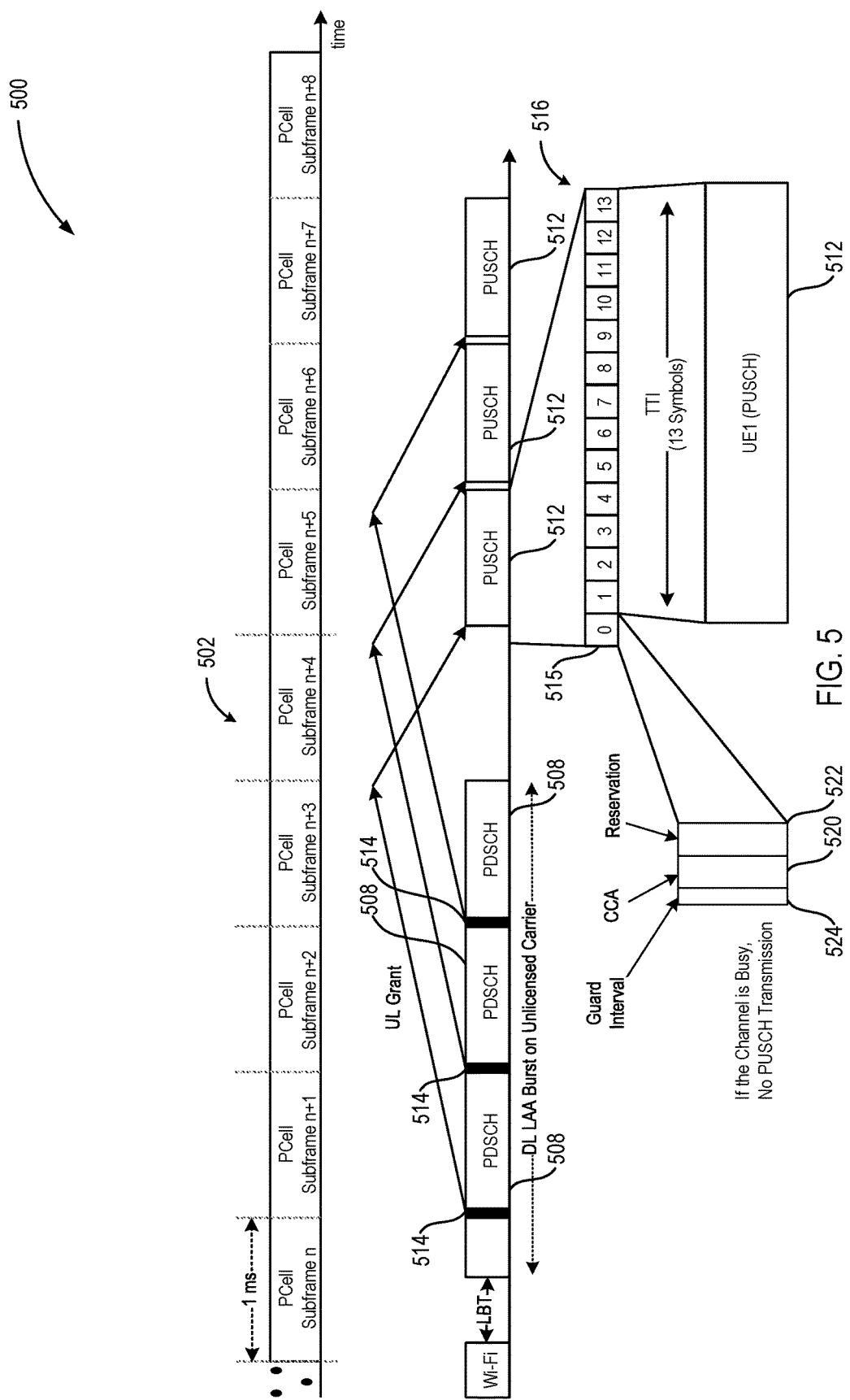
FIG. 5 is a diagram illustrating self-carrier scheduling with UL guard interval, LBT sensing and reservation transmission using a first symbol of a UL subframe consistent with embodiments disclosed herein.

FIG. 5 illustrates self-carrier scheduling 500 with a UL guard interval 524, LBT sensing (e.g., CCA 520) and reservation transmission 522 using a first symbol 515 of a UL subframe 516. The guard interval 524 can be present before the LBT sensing (e.g., CCA 520) at the UE starts to account for the propagation delay of the DL transmission from the serving eNB. CCA 520 can be performed at the start of the sensing OFDM symbol or after the guard interval 524. A reservation signal 522 can be transmitted until the subframe 512 boundary.

In some embodiments, a reservation signal is transmitted in DL, if a PDSCH transmission 508 is not transmitted to prevent other devices from occupying the shared wireless medium. UL grants 514 can be transmitted during the PDSCH 508 transmission schedule. Unused portions of the PDSCH transmission schedule can include a reservation signal.

Cross-carrier scheduling can also be used with the single interval LBT for PUSCH transmission. Similar to the embodiment discussed in connection with FIG. 5, the UE performs single interval LBT. However, a UL grant is transmitted on a licensed carrier.

Figure 6:
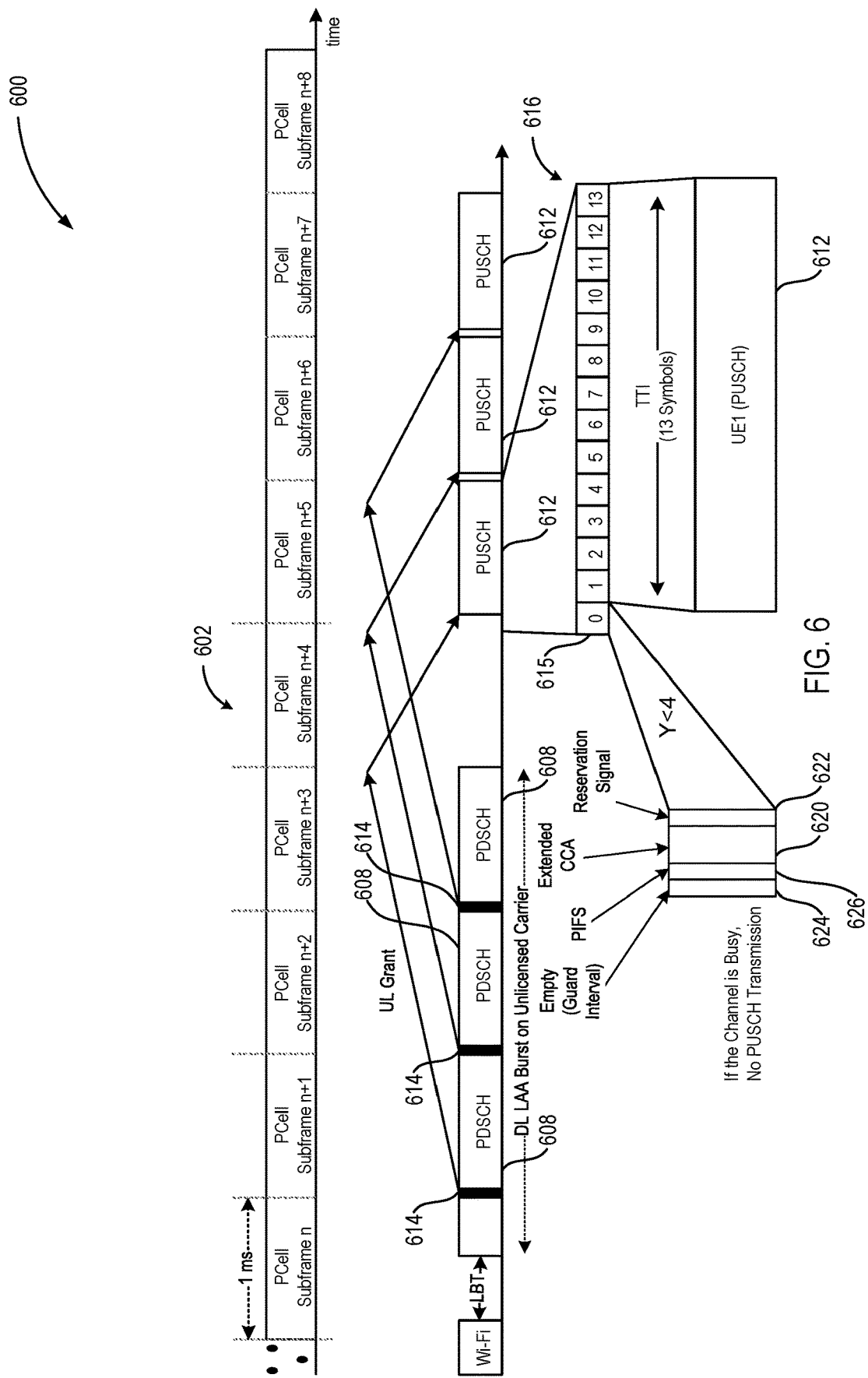
FIG. 6 is a diagram illustrating self-carrier scheduling with UL guard interval, LBT sensing with a variable contention window resulting in using a first symbol of a UL subframe and reservation transmission consistent with embodiments disclosed herein.
Figure 7:
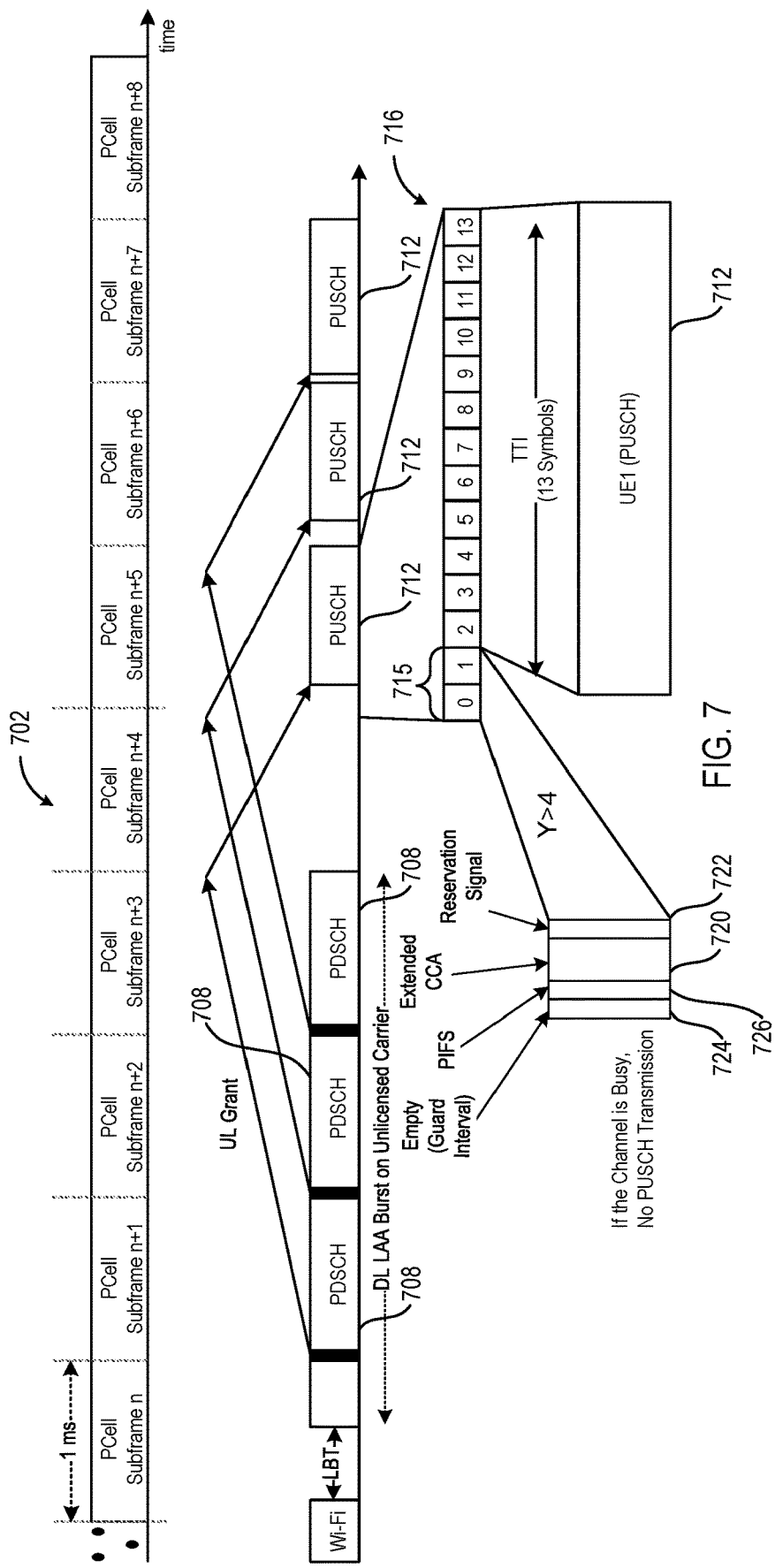
FIG. 7 is a diagram illustrating self-carrier scheduling with UL guard interval, LBT sensing with a variable contention window resulting in using two symbols of a UL subframe and reservation transmission consistent with embodiments disclosed herein.

FIG. 6 and FIG. 7 illustrate self-carrier scheduling with a UL guard interval and LBT sensing with a variable contention window. A variable contention window in FIG. 6 results in a single symbol 615 use, while the variable contention window in FIG. 7 results in two symbol 715 use. A category 4 LBT can be used before PUSCH transmission 612, 712 for self-carrier scheduling.

For example, a UE performs a category 4 LBT before PUSCH transmission with a maximum contention window of Y>0. The minimum contention size is limited to X>0, such that Y>=X. After receiving a UL grant 614, a UE performs LBT during a sensing duration of one 615 or more symbols 715 of the subframe 616, 716 scheduled for UL transmission. The number of symbols used for sensing is based on a chosen value of Y. If CCA+9*Y μs is more than first symbol 615 duration, then two symbols 715 can be used for channel sensing as shown in FIG. 7. More specifically, if Y<4, then only one SC-FDMA symbol 615 is enough for sensing (as shown in FIG. 6); otherwise, more symbols 715 can be used (as shown in FIG. 7). In other embodiments, a UE performs LBT during one or more symbols of a previous subframe. In some embodiments, the eNB may puncture the symbols of a DL subframe (such as PDSCH 608, 708) to allow a UE to perform LBT (such as an extended CCA 620).

The symbols can be used for several different applications. For example, a guard period 624, 724 may also be introduced before the start of LBT (CCA 620, 720) to enable UE and account for any propagation delays on the downlink transmission before LBT is started. If LBT is completed before the symbol boundary used for sensing, a reservation signal 622, 722 can be transmitted until remaining sensing duration. A point coordination function interface space (PIFS) duration 626, 726 can be added to allow for better coordination with WLAN transmissions.

If the LBT (e.g., extended CCA 620) cannot be completed during the allowed sensing duration, the scheduled PUSCH transmission 612 is not transmitted. UE may generate a new contention window based after receiving a new UL grant and restart LBT or the UE may freeze the contention window if the UL LBT cannot be completed with the allocated sensing duration until the next UL LBT attempt. In some embodiments, the random backoff counter used for extended CCA is generated at the eNB. It is signaled to UE via downlink control information (DCI).

The sensing duration and the number of allowed symbols used for performing LBT may be signaled to UE via DCI or can be implicitly completed based on the choice of Y or the backoff counter. As one of the embodiments, backoff counter and sensing duration can be transmitted along with a UL grant.

In another embodiment, a category 4 LBT for PUSCH transmission with cross-carrier scheduling can be used. In this option, the UL grant is transmitted via cross-carrier scheduling, wherein an eNB may not perform LBT before transmitting the UL grant. After reception of the UL grant, the UE follows the similar procedure described in connection with FIGS. 6 and 7. In some embodiments, a LBT procedure can proceed from the start of the subframe previous to the scheduled subframe.

Figure 8:
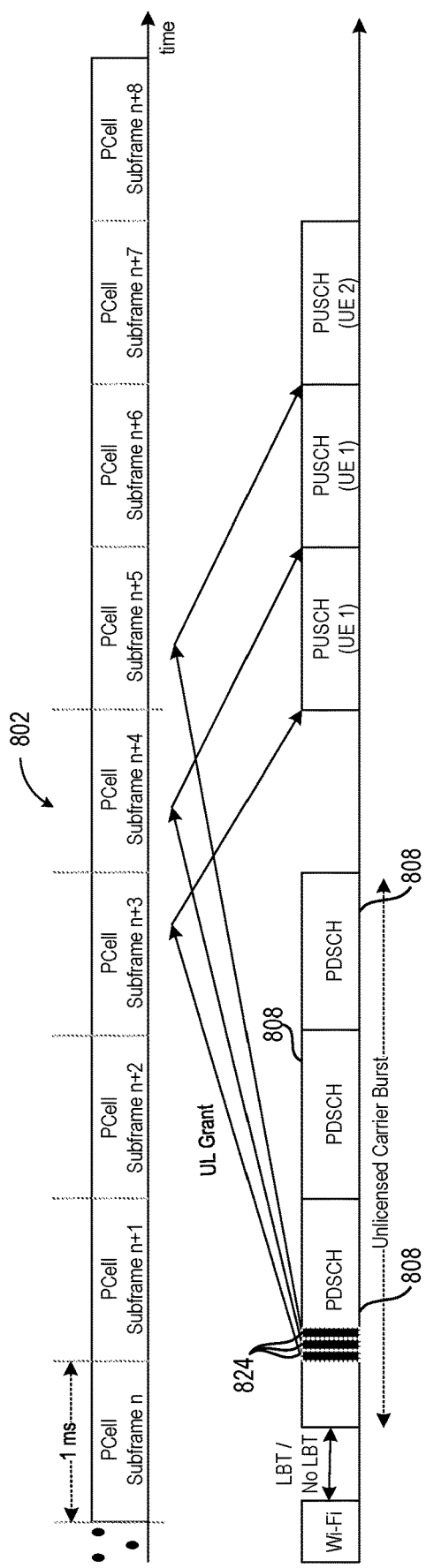
FIG. 8 is a diagram illustrating UL grant bundling consistent with embodiments disclosed herein.

FIG. 8 illustrates UL grant bundling. Instead of transmitting an uplink grant in every subframe 808, UL grants 824 can bundled together for a duration of UL transmission during one transmit opportunity. Such UL grants can be transmitted once at the start of a DL burst. A new UL grant container can be defined which contains a UeID (C-RNTI) and data describing a starting subframe number and an ending subframe number for the UL transmission. A relative subframe number can be used with respect to the first subframe of the DL burst.

Figure 9:
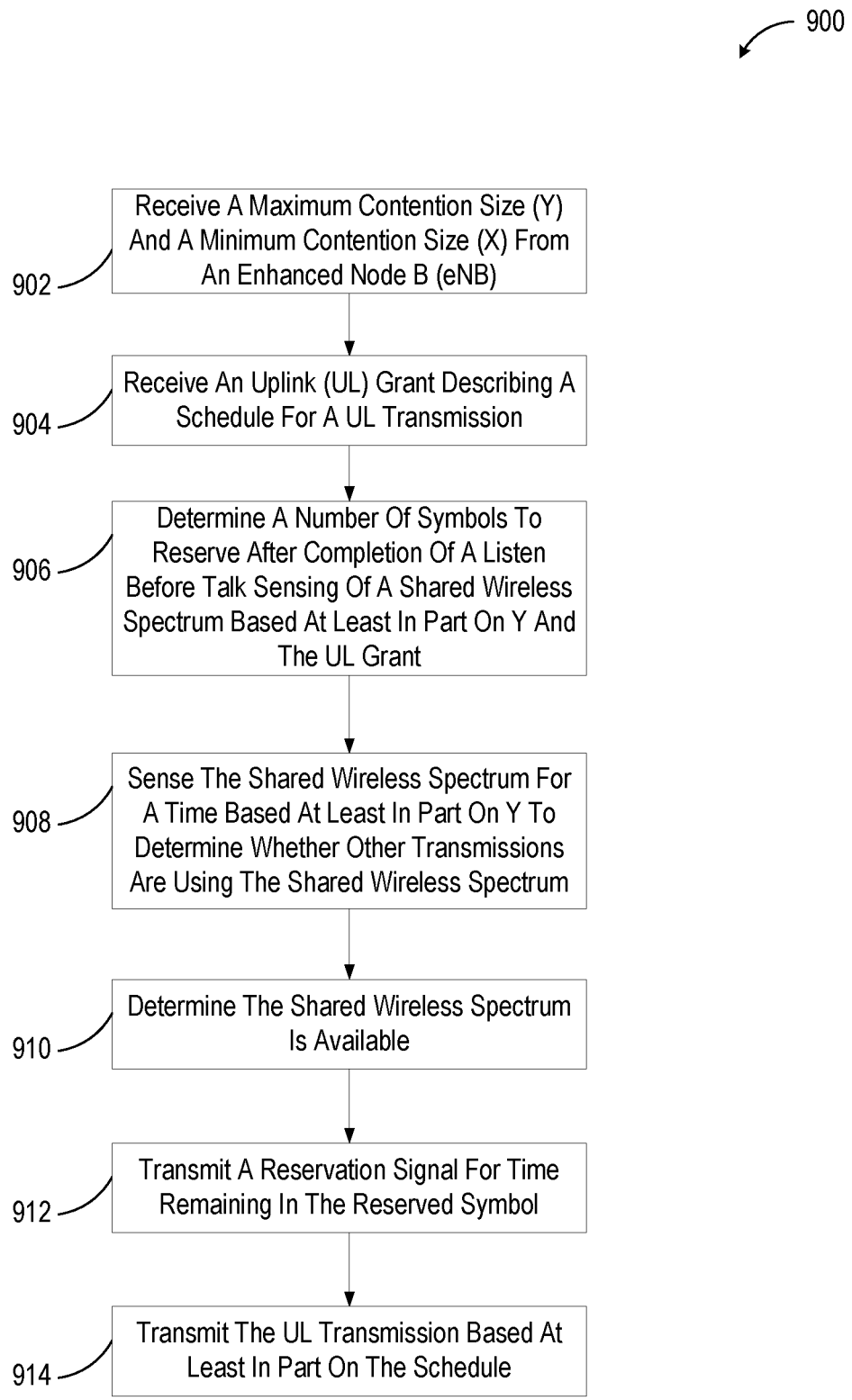
FIG. 9 is a flow chart illustrating a method for sharing a shared wireless spectrum consistent with embodiments disclosed herein.

FIG. 9 shows a flowchart 900 of a method for sharing a shared wireless spectrum. The method can be implemented by a system, such as one shown in conjunction with FIGS. 11 and 12, including an eNB, a UE or other systems or devices. In block 902, a UE receives a maximum contention size (Y) and a minimum contention size (X) from an enhanced Node B (eNB). In block 904, a UE receives an uplink (UL) grant describing a schedule for a UL transmission. In block 906, a UE determines a number of symbols to reserve after completion of a listen before talk sensing of a shared wireless spectrum based at least in part on Y and the UL grant. In block 908, a UE senses the shared wireless spectrum for a time based at least in part on Y to determine whether other transmissions are using the shared wireless spectrum. In block 910, the UE determines that the shared wireless spectrum is available. In block 912, the UE transmits a reservation signal for time remaining in the reserved symbol. In block 914, the UE transmits the UL transmission based at least in part on the schedule.

Figure 10:
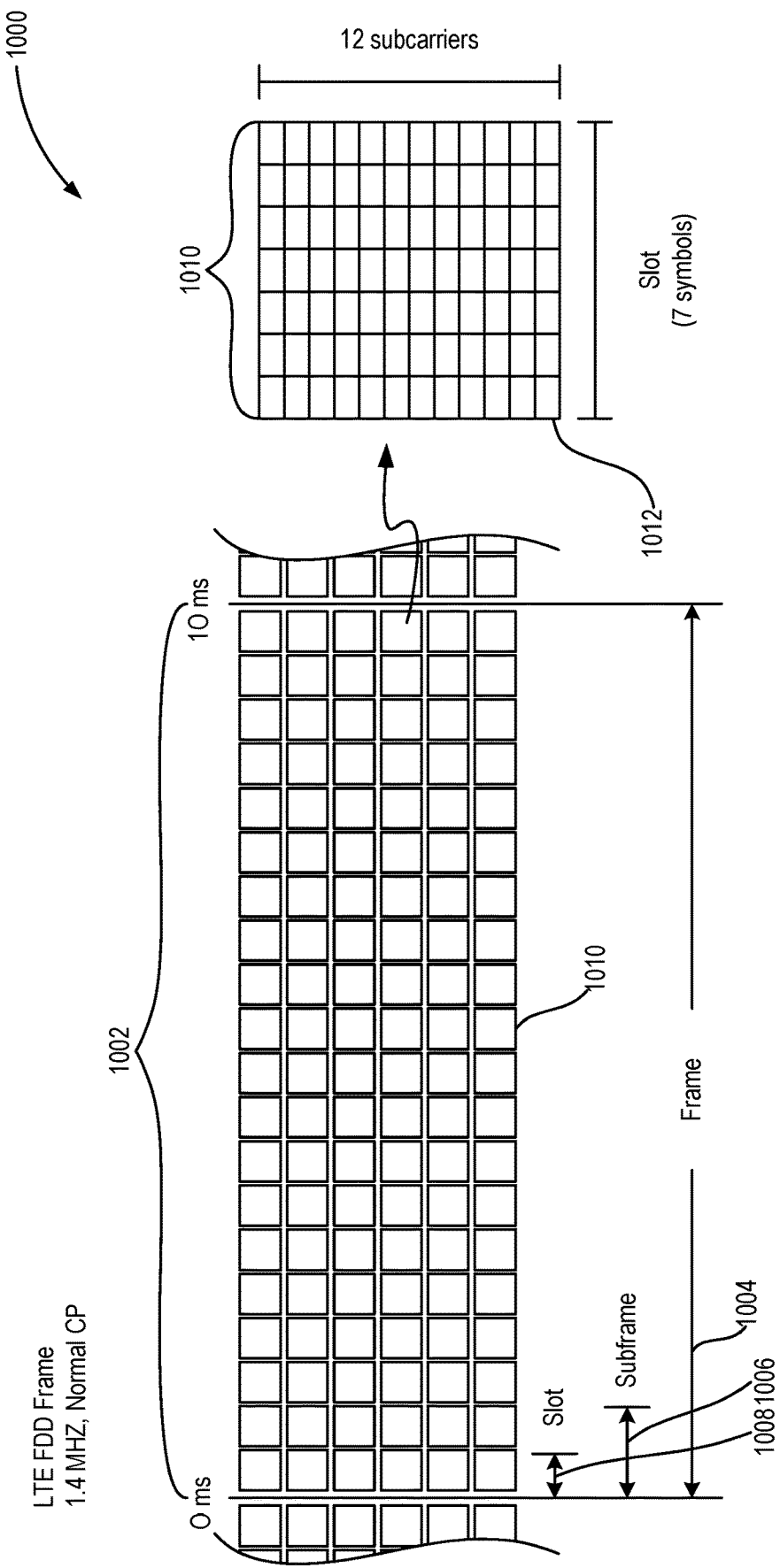
FIG. 10 is a diagram illustrating a long term evolution (LTE) communication frame of 10 ms duration consistent with embodiments disclosed herein.

FIG. 10 is a diagram 1000 illustrating long term evolution (LTE) communication frame 1004 of 10 ms duration 1002. In one embodiment, each frequency allocation (carrier) can be in 108 kHz increments. In the diagram shown, a minimum of six carriers are shown. This allows for a bandwidth of 1.08 MHz (six carriers times 180 kHz=1.08 MHz bandwidth). In some embodiments, the carriers can be expanded to 110 blocks (110 carriers times 180 kHz=19.8 MHz). Frame 1004 can be 10 ms with each slot 1008 being 0.5 ms (and each subframe 1006 being 1 ms).

Slot 1008 at a carrier is resource block 1010, which includes seven symbols at 12 orthogonal frequency-division multiplexing (OFDM) subcarriers. Resource element 1012 is one OFDM subcarrier for the duration of one OFDM symbol. Resource block 1010 can include 84 resource elements 1012 when using a normal cyclic prefix (CP). OFDM spacing between individual subcarriers in LTE can be 15 kHz. A guard period of a CP can be used in the time domain to help prevent multipath inter-symbol interference (ISI) between subcarriers. The CP can be a guard period before each OFDM symbol in each subcarrier to prevent ISI (such as due to multipath).

Figure 11:
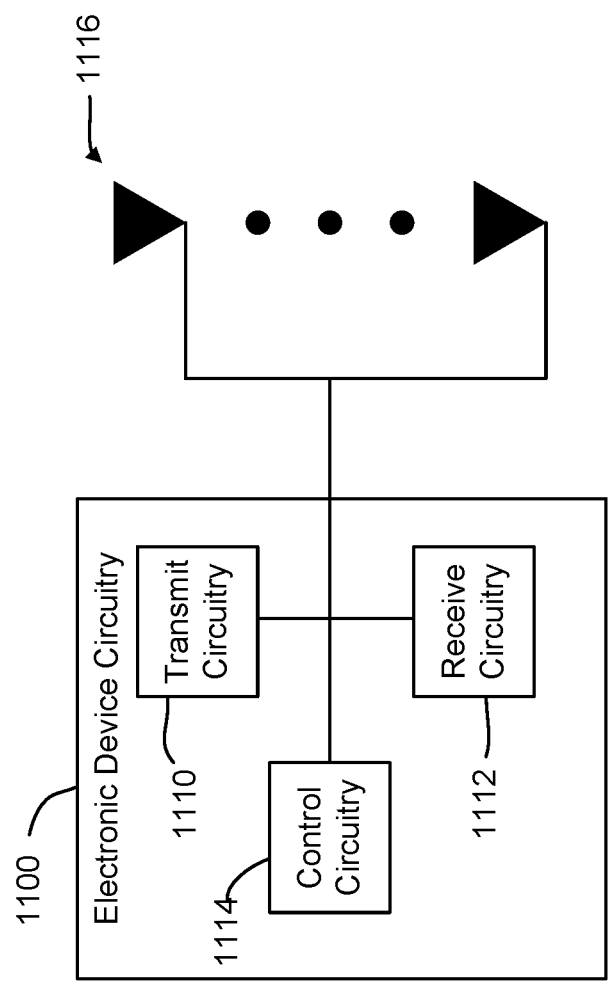
FIG. 11 is a block diagram illustrating electronic device circuitry consistent with embodiments disclosed herein.

FIG. 11 is a block diagram illustrating electronic device circuitry 1100 that may be eNB circuitry, UE circuitry, network node circuitry, or some other type of circuitry in accordance with various embodiments. In embodiments, the electronic device circuitry 1100 may be, or may be incorporated into or otherwise a part of, an eNB, a UE, a mobile station (MS), a BTS, a network node, or some other type of electronic device. In embodiments, the electronic device circuitry 1100 may include radio transmit circuitry 1110 and receive circuitry 1112 coupled to control circuitry 1114. In embodiments, the transmit circuitry 1110 and/or receive circuitry 1112 may be elements or modules of transceiver circuitry, as shown. The electronic device circuitry 1110 may be coupled with one or more plurality of antenna elements 1116 of one or more antennas. The electronic device circuitry 1100 and/or the components of the electronic device circuitry 1100 may be configured to perform operations similar to those described elsewhere in this disclosure.

In embodiments where the electronic device circuitry 1100 is or is incorporated into or otherwise part of a UE, the transmit circuitry 1110 can transmit PUSCH transmissions as shown in FIGS. 1-8. The receive circuitry 1112 can receive PDSCH transmissions as shown in FIGS. 1-8.

In embodiments where the electronic device circuitry 1100 is an eNB, BTS and/or a network node, or is incorporated into or is otherwise part of an eNB, BTS and/or a network node, the transmit circuitry 1110 can transmit PDSCH transmissions as shown in FIGS. 1-8. The receive circuitry 1112 can receive PUSCH transmissions as shown in FIGS. 1-8.

In certain embodiments, the electronic device circuitry 1100 shown in FIG. 11 is operable to perform one or more methods, such as the methods shown in FIG. 9.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 12:
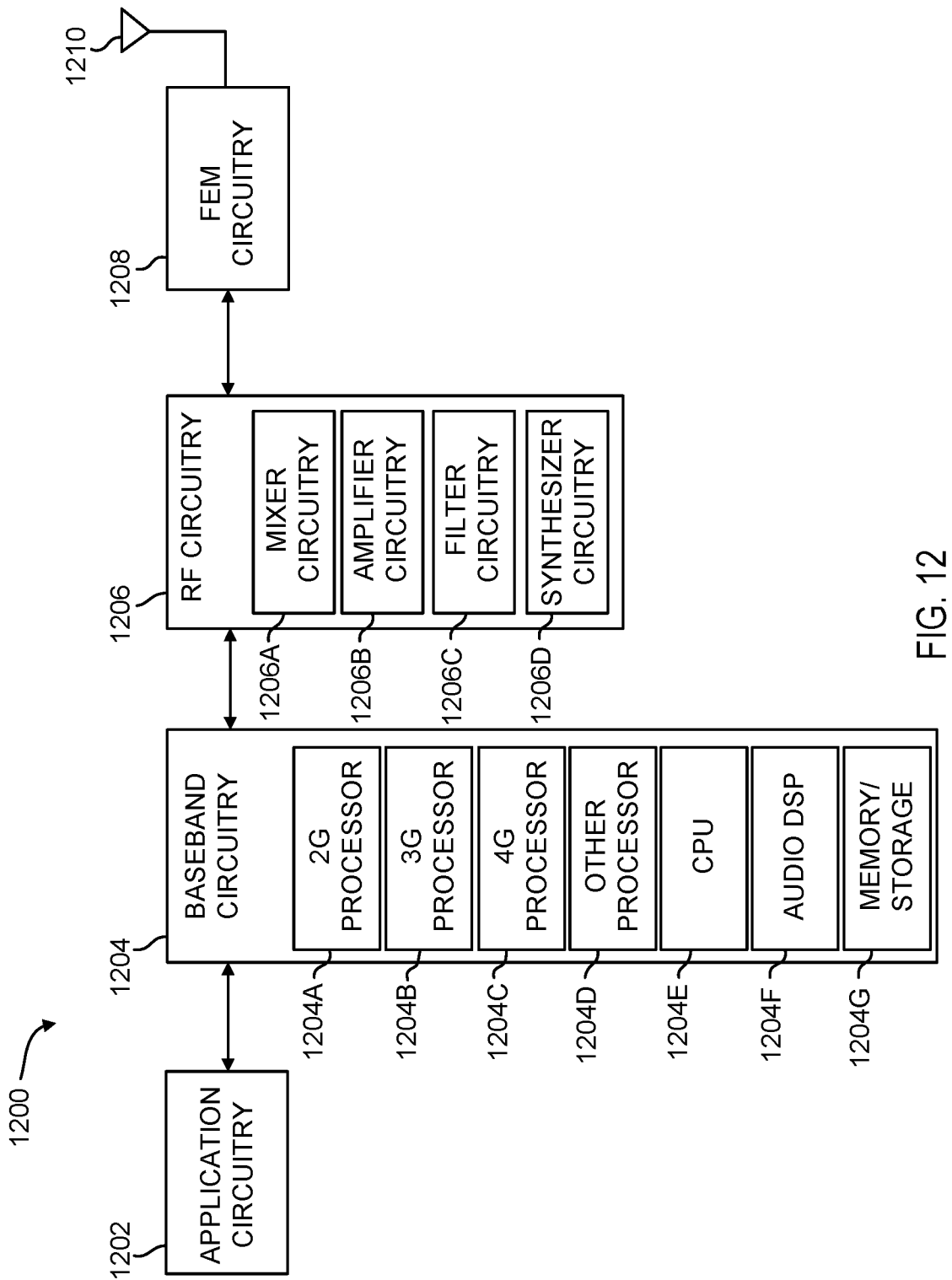
FIG. 12 is a block diagram illustrating a user equipment (UE) device consistent with embodiments disclosed herein.

Embodiments described herein may be implemented into a system using any suitably configured hardware and/or software. FIG. 12 is a block diagram illustrating, for one embodiment, example components of a user equipment (UE) or mobile station (MS) device 1200. In some embodiments, the UE device 1200 may include application circuitry 1202, baseband circuitry 1204, Radio Frequency (RF) circuitry 1206, front-end module (FEM) circuitry 1208, and one or more antennas 1210, coupled together at least as shown in FIG. 12.

The application circuitry 1202 may include one or more application processors. By way of non-limiting example, the application circuitry 1202 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1204 may include one or more single-core or multi-core processors. The baseband circuitry 1204 may include one or more baseband processors and/or control logic. The baseband circuitry 1204 may be configured to process baseband signals received from a receive signal path of the RF circuitry 1206. The baseband 1204 may also be configured to generate baseband signals for a transmit signal path of the RF circuitry 1206. The baseband processing circuitry 1204 may interface with the application circuitry 1202 for generation and processing of the baseband signals, and for controlling operations of the RF circuitry 1206.

By way of non-limiting example, the baseband circuitry 1204 may include at least one of a second generation (2G) baseband processor 1204A, a third generation (3G) baseband processor 1204B, a fourth generation (4G) baseband processor 1204C, other baseband processor(s) 1204D for other existing generations, and generations in development or to be developed in the future (e.g., fifth generation (5G), 6G, etc.). The baseband circuitry 1204 (e.g., at least one of baseband processors 1204A-1204D) may handle various radio control functions that enable communication with one or more radio networks via the RF circuitry 1206. By way of non-limiting example, the radio control functions may include signal modulation/demodulation, encoding/decoding, radio frequency shifting, other functions, and combinations thereof. In some embodiments, modulation/demodulation circuitry of the baseband circuitry 1204 may be programmed to perform Fast-Fourier Transform (FFT), precoding, constellation mapping/demapping functions, other functions, and combinations thereof. In some embodiments, encoding/decoding circuitry of the baseband circuitry 1204 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1204 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204E of the baseband circuitry 1204 may be programmed to run elements of the protocol stack for signaling of the PHY, MAC, RLC, PDCP and/or RRC layers. In some embodiments, the baseband circuitry 1204 may include one or more audio digital signal processor(s) (DSP) 1204F. The audio DSP(s) 1204F may include elements for compression/decompression and echo cancellation. The audio DSP(s) 1204F may also include other suitable processing elements.

The baseband circuitry 1204 may further include memory/storage 1204G. The memory/storage 1204G may include data and/or instructions for operations performed by the processors of the baseband circuitry 1204 stored thereon. In some embodiments, the memory/storage 1204G may include any combination of suitable volatile memory and/or non-volatile memory. The memory/storage 1204G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1204G may be shared among the various processors or dedicated to particular processors.

Components of the baseband circuitry 1204 may be suitably combined in a single chip, a single chipset, or disposed on a same circuit board in some embodiments. In some embodiments, some or all of the constituent components of the baseband circuitry 1204 and the application circuitry 1202 may be implemented together, such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

The RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. The RF circuitry 1206 may include a receive signal path which may include circuitry to down-convert RF signals received from the FEM circuitry 1208, and provide baseband signals to the baseband circuitry 1204. The RF circuitry 1206 may also include a transmit signal path which may include circuitry to up-convert baseband signals provided by the baseband circuitry 1204, and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206A, amplifier circuitry 1206B, and filter circuitry 1206C. The transmit signal path of the RF circuitry 1206 may include filter circuitry 1206C and mixer circuitry

1206A. The RF circuitry 1206 may further include synthesizer circuitry 1206D configured to synthesize a frequency for use by the mixer circuitry 1206A of the receive signal path and the transmit signal path. In some embodiments, the mixer circuitry 1206A of the receive signal path may be configured to down-convert RF signals received from the FEM circuitry 1208 based on the synthesized frequency provided by synthesizer circuitry 1206D. The amplifier circuitry 1206B may be configured to amplify the down-converted signals.

The filter circuitry 1206C may include a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may include zero-frequency baseband signals, although this is not a requirement. In some embodiments, the mixer circuitry 1206A of the receive signal path may comprise passive mixers, although the scope of the embodiments is not limited in this respect.

In some embodiments, the mixer circuitry 1206A of the transmit signal path may be configured to up-convert input baseband signals based on the synthesized frequency provided by the synthesizer circuitry 1206D to generate RF output signals for the FEM circuitry 1208. The baseband signals may be provided by the baseband circuitry 1204 and may be filtered by filter circuitry 1206C. The filter circuitry 1206C may include a low-pass filter (LPF), although the scope of the embodiments is not limited in this respect. In some embodiments, the mixer circuitry 1206A of the receive signal path and the mixer circuitry 1206A of the transmit signal path may include two or more mixers, and may be arranged for quadrature downconversion and/or upconversion, respectively. In some embodiments, the mixer circuitry 1206A of the receive signal path and the mixer circuitry 1206A of the transmit signal path may include two or more mixers and may be arranged for image rejection (e.g., Hartley image rejection). In some embodiments, the mixer circuitry 1206A of the receive signal path and the mixer circuitry 1206A may be arranged for direct downconversion and/or direct upconversion, respectively. In some embodiments, the mixer circuitry 1206A of the receive signal path and the mixer circuitry 1206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 1206 may include analog-to-digital converter (ADC) and digital-to-analog converter (DAC) circuitry, and the baseband circuitry 1204 may include a digital baseband interface to communicate with the RF circuitry 1206.

In some dual-mode embodiments, separate radio IC circuitry may be provided for processing signals for each spectrum, although the scope of the embodiments is not limited in this respect.

In some embodiments, the synthesizer circuitry 1206D may include one or more of a fractional-N synthesizer and a fractional N/N+1 synthesizer, although the scope of the embodiments is not limited in this respect as other types of frequency synthesizers may be suitable. For example, synthesizer circuitry 1206D may include a delta-sigma synthesizer, a frequency multiplier, a synthesizer comprising a phase-locked loop with a frequency divider, other synthesizers and combinations thereof.

The synthesizer circuitry 1206D may be configured to synthesize an output frequency for use by the mixer circuitry 1206A of the RF circuitry 1206 based on a frequency input and a divider control input. In some embodiments, the synthesizer circuitry 1206D may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

The synthesizer circuitry 1206D of the RF circuitry 1206 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1206D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

The FEM circuitry 1208 may include a receive signal path which may include circuitry configured to operate on RF signals received from one or more antennas 1210, amplify the received signals, and provide the amplified versions of the received signals to the RF circuitry 1206 for further processing. The FEM circuitry 1208 may also include a transmit signal path which may include circuitry configured to amplify signals for transmission provided by the RF circuitry 1206 for transmission by at least one of the one or more antennas 1210.

In some embodiments, the FEM circuitry 1208 may include a TX/RX switch configured to switch between a transmit mode and a receive mode operation. The FEM circuitry 1208 may include a receive signal path and a transmit signal path. The receive signal path of the FEM circuitry 1208 may include a low-noise amplifier (LNA) to amplify received RF signals and provide the amplified received RF signals as an output (e.g., to the RF circuitry 1206). The transmit signal path of the FEM circuitry 1208 may include a power amplifier (PA) configured to amplify input RF signals (e.g., provided by RF circuitry 1206), and one or more filters configured to generate RF signals for subsequent transmission (e.g., by one or more of the one or more antennas 1210.

In some embodiments, the UE device 1200 may include additional elements such as, for example, memory/storage, a display, a camera, one of more sensors, an input/output (I/O) interface, other elements, and combinations thereof.

In some embodiments, the UE device 1200 may be configured to perform one or more processes, techniques, and/or methods as described herein, or portions thereof.

Figure 13:
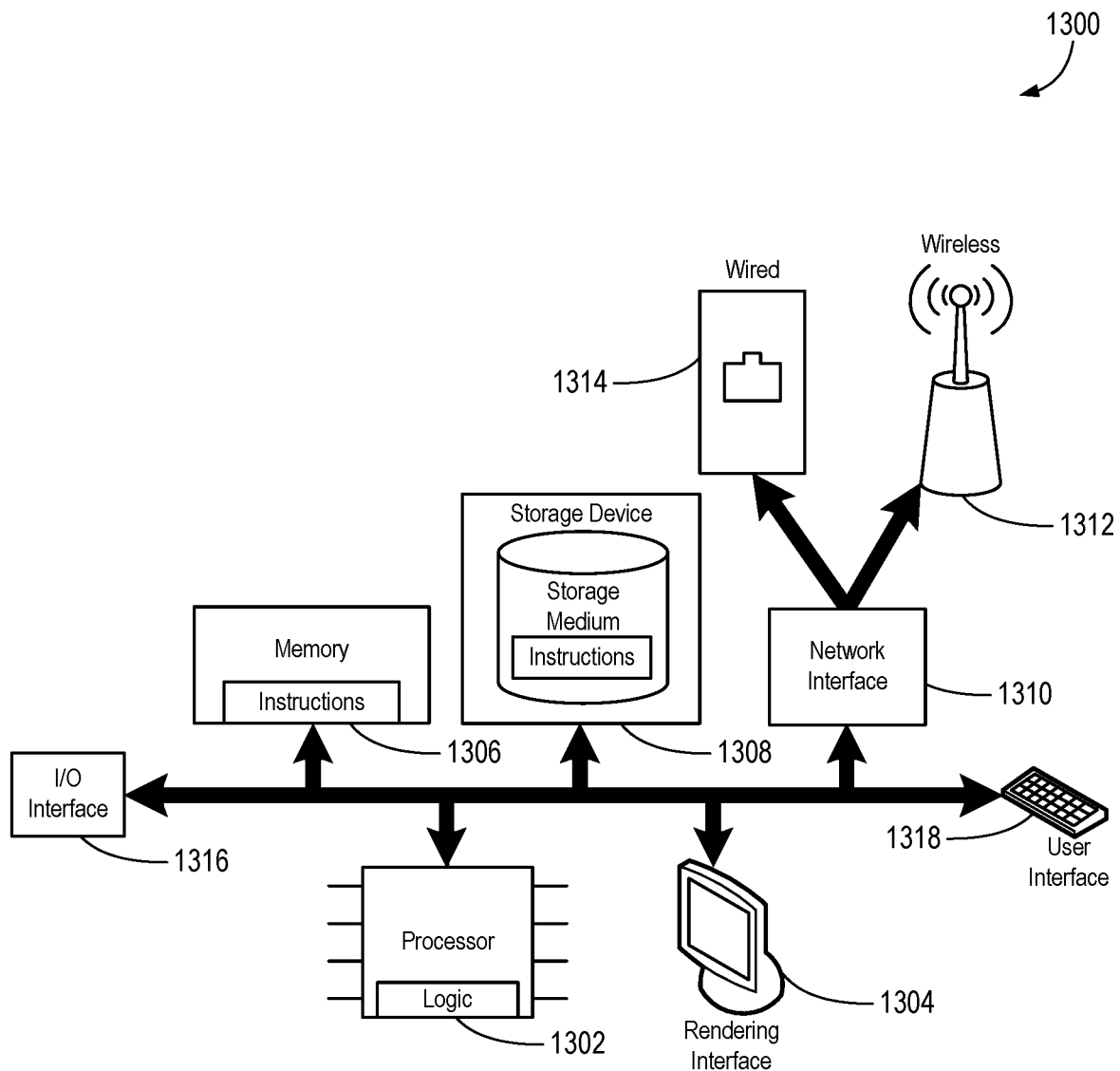
FIG. 13 is a schematic diagram of a computing system consistent with embodiments disclosed herein.

FIG. 13 is a schematic diagram of computing system 1300. Computing system 1300 can be viewed as an information passing bus that connects various components. In the embodiment shown, computing system 1300 includes processor 1302 having logic 1302 for processing instructions. Instructions can be stored in and/or retrieved from memory 1306 and storage device 1308 that includes a computer-readable storage medium. Instructions and/or data can arrive from network interface 1310 that can include wired 1314 or wireless 1312 capabilities. Instructions and/or data can also come from I/O interface 1316 that can include such things as expansion cards, secondary buses (e.g., USB, etc.), devices, etc. A user can interact with computing system 1300 though user interface devices 1318 and rendering system 1304 that allows the computer to receive and provide feedback to the user.

EXAMPLES

Example 1 is An apparatus for a user equipment (UE) for licensed assisted access (LAA) using listen before talk. The UE includes a first wireless interface, an unlicensed spectrum wireless interface, and a baseband processor attached to the first wireless interface and the unlicensed spectrum wireless interface. The first wireless interface is designed to communicate with an enhanced node B (eNB) using a first carrier in a wireless medium. The unlicensed spectrum wireless interface is designed to communicate with the eNB using a second carrier in an unlicensed medium. The baseband processor is designed to receive an uplink (UL) grant from the eNB for the second carrier, and sense the unlicensed medium before the physical UL shared channel (PUSCH) schedule indicated in the UL grant. When the unlicensed medium is idle, it transmits a PUSCH transmission during the PUSCH schedule, and when the unlicensed medium is busy, it prevents the PUSCH transmission during the PUSCH schedule.

Example 2 includes the apparatus of Example 1, where the first wireless interface is designed to communicate with the eNB using the first carrier in a licensed medium.

Example 3 includes the apparatus of Example 1, where sensing the unlicensed medium also includes sensing the unlicensed medium for a single interval before the physical UL shared channel (PUSCH) schedule indicated in the UL grant.

Example 4 includes the apparatus of Example 1, which also transmits a reservation signal after sensing the unlicensed medium and before transmitting the PUSCH transmission.

Example 5 includes the apparatus of Example 1, where sensing the wireless medium also includes using clear channel assessment to determine whether the unlicensed medium is busy.

Example 6 includes the apparatus of Example 5, where sensing the wireless medium further includes waiting a guard interval before using clear channel assessment to account for propagation delay of downlink transmission from a serving eNB.

Example 7 includes the apparatus of any of Examples 1-6, where the UL grant is received using the second carrier.

Example 8 includes the apparatus of any of Examples 1-6, where the UL grant is received using the first carrier.

Example 9 includes the apparatus of any of Examples 1-6, and also includes receiving a second UL grant from the eNB for the second carrier which is scheduled to follow the UL grant. After transmitting the PUSCH transmission, the system senses the unlicensed medium for a second single interval before a second PUSCH schedule as specified in the second UL grant. When the unlicensed medium is idle a second time, the system transmits a second PUSCH transmission during the second PUSCH schedule Example 10 includes the apparatus of any of Examples 1-6, including receiving a second UL grant from the eNB for the second carrier which is scheduled to follow the UL grant. After transmitting the PUSCH transmission and without sensing the unlicensed medium, the system transmits a second PUSCH transmission during the second PUSCH schedule.

Example 11 includes the apparatus of Example 10, where the second UL grant from the eNB is bundled with the UL grant.

Example 12 is an enhanced Node B (eNB) for sharing a wireless medium with WLAN. The eNB includes a first wireless interface, a shared medium wireless interface, and a processor. The first wireless interface is designed to communicate with a user equipment (UE) in a wireless medium. The shared medium wireless interface is designed to communicate with the UE in a shared medium shared with WLAN. The processor is designed to sense the shared medium to determine if the shared medium is busy. When the shared medium is idle, it transmits an uplink (UL) grant to the UE, which grant schedules a UE transmission using the shared medium, and receives a UE transmission over the shared medium containing a complete subframe.

Example 13 includes the eNB of Example 12, where the processor is also designed to transmit a reservation signal in a gap between one or more eNB transmissions and the UE transmission scheduled by the UL grant.

Example 14 includes the eNB of Example 12, where sensing the shared medium includes performing clear channel assessment.

Example 15 includes the eNB of Example 12, where transmitting the uplink (UL) grant to the UE also transmits the uplink (UL) grant on the shared medium.

Example 16 includes the eNB of Example 15, where the first wireless interface uses a first carrier, and where the shared medium wireless interface uses a second carrier, and where the first and second carriers are unsynchronized.

Example 17 includes the eNB of Example 15, where the first wireless interface uses a first carrier in a licensed spectrum, and where the shared medium wireless interface uses a second carrier, and where the first and second carriers are synchronized.

Example 18 includes the eNB of Example 12, where transmitting the uplink (UL) grant to the UE also transmits the uplink (UL) grant on the wireless medium.

Example 19 includes the eNB of Example 18, where the first wireless interface uses a first carrier, and where the shared medium wireless interface uses a second carrier, and where the first and second carriers are synchronized.

Example 20 includes the eNB of Example 12, where transmitting an uplink (UL) grant to the UE also bundling multiple UL grants to the UE, the UL grants for a sequence of subframes.

Example 21 is at least one computer readable storage medium having stored thereon instructions that, when executed by a computing device, cause the computing device to perform a method. The method includes receiving a maximum contention size (Y) and a minimum contention size (X) from an enhanced Node B (eNB). It further includes receiving an uplink (UL) grant describing a schedule for a UL transmission, determining a number of symbols to reserve after completion of a listen before talk sensing of a shared wireless spectrum, based in part on Y and UL grants, sensing the shared wireless spectrum for a time based in part on Y to determine whether other transmissions are using the shared wireless spectrum. When the shared wireless spectrum is determined to be available, it transmits a reservation signal for time remaining in the reserved symbol and transmits the UL transmission based in part on the schedule.

Example 22 includes the computer readable storage medium of Example 21, where two symbols of a subframe are used when Y>4, and one symbol of a subframe is used when Y≤4.

Example 23 includes the computer readable storage medium of Example 21, where Y>X≥0.

Example 24 includes the computer readable storage medium of Example 21, including using a category 4 listen before talk.

Example 25 includes the computer readable storage medium of Example 21, including waiting for a guard interval before using clear channel assessment to account for propagation delay of downlink transmission from a serving eNB.

Example 26 includes the computer readable storage medium of Example 21, where sensing the shared wireless spectrum also includes performing an extended clear channel assessment.

Example 27 includes the computer readable storage medium of Example 21, where the UL grant is received using a shared wireless spectrum.

Example 28 includes the computer readable storage medium of any of Examples 21-27, where a random counter is generated between X and Y.

Example 29 includes the computer readable storage medium of Example 28, where the random counter is decremented after every slot if the channel is sensed as idle.

Example 30 includes the computer readable storage medium of Example 28, where if the random counter is greater than 0 and the channel is sensed as busy, the program performs additional sensing for a point coordination function interface space (PIFS) duration before resuming decrementing the counter.

Example 31 includes the computer readable storage medium of Example 28, including transmitting physical uplink shared channel (PUSCH) when the counter reaches to 0.

Example 32 includes the computer readable storage medium of Example 28, where a decremented value of counter is reused when the shared wireless spectrum is determined to be unavailable.

Example 33 includes the computer readable storage medium of any of Examples 21-27, where a new random counter is generated when the shared wireless spectrum is determined to be unavailable.

Example 34 includes the computer readable storage medium of any of Examples 21-27, including waiting for a point coordination function interface space (PIFS) before using clear channel assessment to allow for priority access to the shared wireless spectrum.

Example 35 includes the computer readable storage medium any of Examples 21-27, where a decremented value of Y is reused when the shared wireless spectrum is determined to be unavailable.

Example 36 is a method for sharing a shared wireless spectrum. The method includes receiving a maximum contention size (Y) and a minimum contention size (X) from an enhanced Node B (eNB), receiving an uplink (UL) grant describing a schedule for a UL transmission, determining a number of symbols to reserve for a listen before talk sensing of a shared wireless spectrum based in part on Y and the UL grant, and sensing the shared wireless spectrum for a time based in part on Y to determine whether other transmissions are using the shared wireless spectrum. When the shared wireless spectrum is available, it transmits a reservation signal for time remaining in the reserved symbol and transmits the UL transmission based in part on the schedule.

Example 37 includes the method of Example 36, where two symbols of a subframe are used when Y>4, and one symbol of a subframe is used when Y≤4.

Example 38 includes the method of Example 36, where Y>X≤0.

Example 39 includes the method of Example 36, including using a category 4 listen before talk.

Example 40 includes the method of Example 36, including waiting for a guard interval before using clear channel assessment to account for propagation delay of downlink transmission from a serving eNB.

Example 41 includes the method of Example 36, where sensing the shared wireless spectrum also includes performing an extended clear channel assessment.

Example 42 includes the method of Example 36, where the UL grant is received using on shared wireless spectrum.

Example 43 includes the method of Example 36, including waiting for a point coordination function interface space (PIFS) before using the clear channel assessment to allow for priority access to the shared wireless spectrum.

Example 44 includes the method of Example 36, where a decremented value of Y is reused when the shared wireless spectrum is unavailable.

Example 45 includes the method of Example 36, where a random counter is generated between X and Y.

Example 46 includes the method of Example 45, where the random counter is decremented after every slot if the channel is idle.

Example 47 includes the method of Example 45, where, if the random counter is greater than 0 and the channel is busy, it will perform additional sensing for a point coordination function interface space (PIFS) duration before resuming decrementing the counter.

Example 48 includes the method of Example 45, including transmitting physical uplink shared channel (PUSCH) when the counter reaches to 0.

Example 49 includes the method of Example 45, where a decremented value of counter is reused when the shared wireless spectrum is unavailable.

Example 50 includes the method of Example 36, where a new random counter is generated when the shared wireless spectrum is determined to be unavailable.

Example 51 is a method of licensed assisted access (LAA) using listen before talk. The method includes receiving an uplink (UL) grant from the an enhanced node B (eNB) for a second carrier in an unlicensed medium, and sensing the unlicensed medium for a single interval before the physical UL shared channel (PUSCH) schedule indicated in the UL grant. When the unlicensed medium is idle, is transmits a PUSCH transmission during the PUSCH schedule. When the unlicensed medium is busy, it prevents the PUSCH transmission during the PUSCH schedule.

Example 52 includes the method of Example 51, including transmitting a reservation signal after sensing the unlicensed medium and before transmitting the PUSCH transmission.

Example 53 includes the method of Example 51, where sensing the wireless medium also includes using clear channel assessment to determine whether the unlicensed medium is busy.

Example 54 includes the method of Example 53, where sensing the wireless medium also includes waiting for a guard interval before using clear channel assessment to account for propagation delay of downlink transmission from a serving eNB.

Example 55 includes the method of Example 51, where the UL grant is received using the second carrier.

Example 56 includes the method of Example 51, where the UL grant is received using the first carrier.

Example 57 includes the method of Example 51, including receiving a second UL grant from the eNB for the second carrier after the second UL grant is scheduled. After transmitting the PUSCH transmission, the method includes sensing the unlicensed medium for a second single interval before a second PUSCH is scheduled. When the unlicensed medium is determined to be idle a second time, it will transmit a second PUSCH transmission during the second PUSCH schedule.

Example 58 includes the method of Example 51, including receiving a second UL grant from the eNB for the second carrier after the second UL grant is scheduled. After transmitting the PUSCH transmission and without sensing the unlicensed medium, the method includes transmitting a second PUSCH transmission during the second PUSCH schedule.

Example 59 includes the method of Example 58, where the second UL grant from the eNB is transmitted with the UL grant.

Example 60 is an apparatus including a way to perform a method as shown in any of Examples 36-59.

Example 61 is a machine-readable storage including machine-readable instructions which, when executed, implement a method or realize an apparatus as shown in any of Examples 36-59.

Example 62 is a machine-readable medium including code which, when executed, causes a machine to perform the method of any one of Examples 36-59.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium (transitory or nontransitory) wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" or "for example" means that a particular feature, structure, or characteristic described in connection with the example is included in at least one embodiment of the described embodiments. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the described embodiments may be referred to herein along with alternatives for the various components thereof. It is understood that such embodiments, examples, and alternatives are not to be construed as de facto equivalents of one another, but are to be considered as separate and autonomous representations of the described embodiments.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of described embodiments. One skilled in the relevant art will recognize, however, that the described embodiments may be practiced without one or more of the specific details, or with other methods, components, materials, etc. In other instances, well-known structures, materials, or operations are not shown or described in detail to avoid obscuring aspects of the described embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the described embodiments are not to be limited to the details given herein, but may be modified within the scope and equivalents of the appended claims.

Those having skill in the art will appreciate that many changes may be made to the details of the above-described embodiments without departing from the underlying principles described herein. However, the scope should, therefore, be determined only by the following claims.

The invention claimed is:

1. An apparatus of a user equipment (UE) for scheduling uplink channel access using a licensed assisted access (LAA) cell, comprising:
   a memory configured to store a counter value;
   a baseband processing unit configured to:
      receive an uplink grant scheduling a transmission and indicating a channel access procedure using a carrier of a LAA channel of the LAA cell;
      set the counter value to a random number between zero and a contention window value, wherein the random number is uniformly distributed between zero and the contention window value;
      select the contention window value between a minimum contention window value and a maximum contention window value based at least in part on the whether the UE was able to transmit a prior transmission in a prior set of subframes;
      sense the LAA channel of the LAA cell for a duration based at least in part on the counter value and an additional predetermined sensing duration, the additional predetermined sensing duration based at least in part on whether the LAA channel is idle during the sensing;
      detect the LAA channel of the LAA cell to be busy during the sensing the LAA channel;
      in response to detecting the LAA channel of the LAA cell to be busy, sense the LAA channel for the additional predetermined sensing duration; and
      enable access to the LAA channel of the LAA cell for the transmission using the LAA cell.

2. The apparatus of claim 1, further comprising a transmission interface configured to access to the LAA channel.

3. The apparatus of claim 1, further comprising to decrement the counter value when the LAA channel is determined to be idle during the sensing of the LAA channel.

4. The apparatus of claim 1, further comprising to sense the LAA channel for an additional sensing duration in response to detecting the LAA channel of the LAA cell to be busy.

5. The apparatus of claim 1, wherein the baseband processing unit is a baseband processor.

6. A non-transitory computer program product comprising a computer-readable storage medium that stores instructions for execution by a processor to perform operations of a User Equipment (UE) for uplink channel access procedure of a licensed assisted access (LAA) cell, the operations, when executed by the processor, to perform a method, the method comprising:
   receive an uplink grant scheduling a physical uplink shared channel (PUSCH) transmission that indicates a channel transmission procedure using a carrier of a LAA channel of the LAA cell;
   set a decrementing counter value to a random number between zero and a contention window value;
   determine, based on input from RF circuitry, the LAA channel to be idle during slot durations of a duration indicated by the decrementing counter value, wherein the duration is a random value uniformly distributed between zero and a contention window value;
   detect that the decrementing counter value has reached zero;
   generate the PUSCH transmission for transmission on the carrier of the LAA cell;
   detect the LAA channel of the LAA cell to be busy during the sensing the LAA channel; and
   in response to detecting the LAA channel of the LAA cell to be busy, sense the LAA channel for an additional predetermined defer duration.

7. The non-transitory computer program product of claim 6, wherein to receive the uplink grant scheduling the PUSCH transmission that indicates the channel transmission procedure further comprises to decode the uplink grant from an enhanced Node B (eNB) scheduling the PUSCH transmission for the LAA channel of the LAA cell.

8. The non-transitory computer program product of claim 6, wherein to sense the LAA channel for the additional defer duration further comprises to sense the LAA channel for the additional defer duration without decrementing the decrementing counter value.

* * * * *